(12) United States Patent
Taylor, III et al.

(10) Patent No.: US 8,086,876 B2
(45) Date of Patent: Dec. 27, 2011

(54) STATIC AND DYNAMIC POWER MANAGEMENT FOR A MEMORY SUBSYSTEM

(75) Inventors: Travis E. Taylor, III, Hutto, TX (US); Richard Wayne Greenwalt, The Woodlands, TX (US)

(73) Assignee: Dell Products L.P., Round Rock, TX (US)

( * ) Notice: Subject to any disclaimer, the term of this patent is extended or adjusted under 35 U.S.C. 154(b) by 821 days.

(21) Appl. No.: 12/166,945

(22) Filed: Jul. 2, 2008

(65) Prior Publication Data

US 2010/0005330 A1 Jan. 7, 2010

(51) Int. Cl.
*G06F 1/00* (2006.01)
*G06F 1/26* (2006.01)
*G06F 1/28* (2006.01)

(52) U.S. Cl. ......... 713/300; 713/320; 713/323; 713/340

(58) Field of Classification Search .................. 713/300, 713/320, 323, 340
See application file for complete search history.

(56) References Cited

U.S. PATENT DOCUMENTS

| | | | |
|---|---|---|---|
| 5,404,543 A * | 4/1995 | Faucher et al. | 713/323 |
| 5,463,261 A | 10/1995 | Skarda et al. | 307/131 |
| 5,884,088 A * | 3/1999 | Kardach et al. | 713/324 |
| 7,463,676 B2 | 12/2008 | Chen | 375/222 |
| 2007/0214289 A1* | 9/2007 | Samson et al. | 710/18 |
| 2008/0040624 A1* | 2/2008 | Wilcox | 713/320 |
| 2009/0172442 A1* | 7/2009 | Alexander et al. | 713/323 |
| 2009/0228656 A1* | 9/2009 | Borkenhagen | 711/118 |
| 2009/0292934 A1* | 11/2009 | Esliger | 713/323 |
| 2010/0005218 A1* | 1/2010 | Gower et al. | 711/5 |

* cited by examiner

*Primary Examiner* — Vincent Tran
(74) *Attorney, Agent, or Firm* — Baker Botts L.L.P.

(57) ABSTRACT

In one embodiment, an information handling system may include a processor, a power supply coupled to the processor, a memory device communicatively coupled to the processor, where the memory device may include (1) a plurality of memory modules, and (2) a memory extender configured to extend a communication bandwidth of the plurality of memory, and a controller coupled to the memory device. The controller may be configured to determine a status of the power supply and/or one or more of the memory modules, and based at least on the determined status, disable the memory extender.

20 Claims, 2 Drawing Sheets

STATIC AND DYNAMIC POWER MANAGEMENT FOR A MEMORY SUBSYSTEM

TECHNICAL FIELD

The present disclosure relates to power management, and more particularly, to static and dynamic power management of a memory subsystem.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as, but not limited to, financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often include memory subsystems that have one or more memory modules (e.g., dual in-line memory modules, DIMMS) that store data locally, which provides faster retrieval and storage of data compared to off-chip memory. As processing demands increase, the need for more local data storage increases. However, due to electrical limitations and manufacturing limitations (e.g., the number of data channels between a processor and the memory modules are limited), the number of memory modules that can be used is restricted. Current solutions, including various bus interfaces to the memory subsystems and daisy-chaining memory modules, often require high-speed devices that may increase power consumption and provide heating problems.

SUMMARY

In accordance with an embodiment of the present disclosure, an information handling system may include a processor, a power supply coupled to the processor, a memory device communicatively coupled to the processor, where the memory device may include (1) a plurality of memory modules, and (2) a memory extender configured to extend a communication bandwidth of the plurality of memory, and a controller coupled to the memory device. The controller may be configured to determine a status of the power supply and/or one or more of the memory modules, and based at least on the determined status, disable the memory extender.

In another embodiment an apparatus may include (1) a memory device that includes a plurality of memory modules and a memory extender configured to extend a communication bandwidth of the plurality of memory modules; and (2) a controller coupled to the memory device, where the controller may be configured to determine a status of at least one of a power supply coupled to the memory device and/or one or more of the memory modules, and based at least on the determined status, disable the memory extender.

In another embodiment, a method includes determining a status of the plurality memory modules of a memory device, determining a status of a power supply, based at least on the determined status of the memory modules and the power supply, disabling at least one memory extender coupled to the plurality of memory modules, wherein the at least one memory extender is configured to extend a communication bandwidth of the plurality of memory modules.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
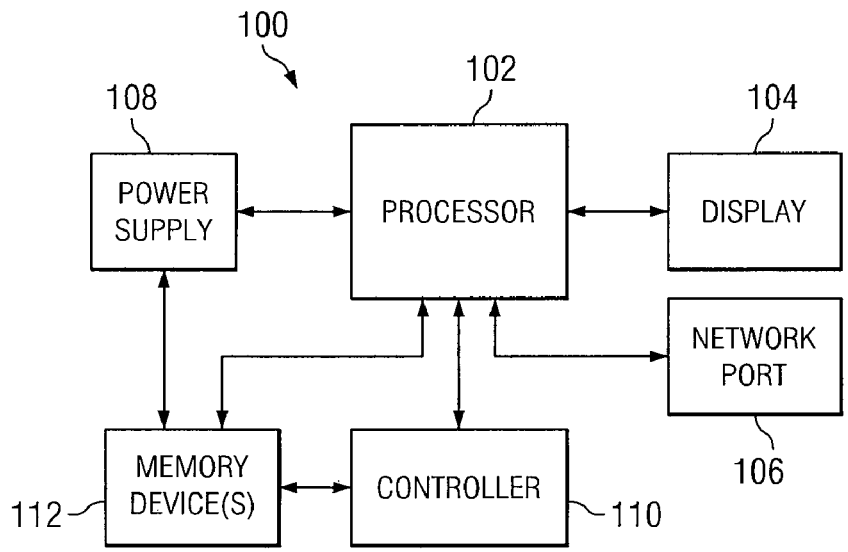
FIG. 1 illustrates a block diagram of an example information handling system configured to provide power management for a memory device, in accordance with embodiments of the present disclosure.
Figure 3:
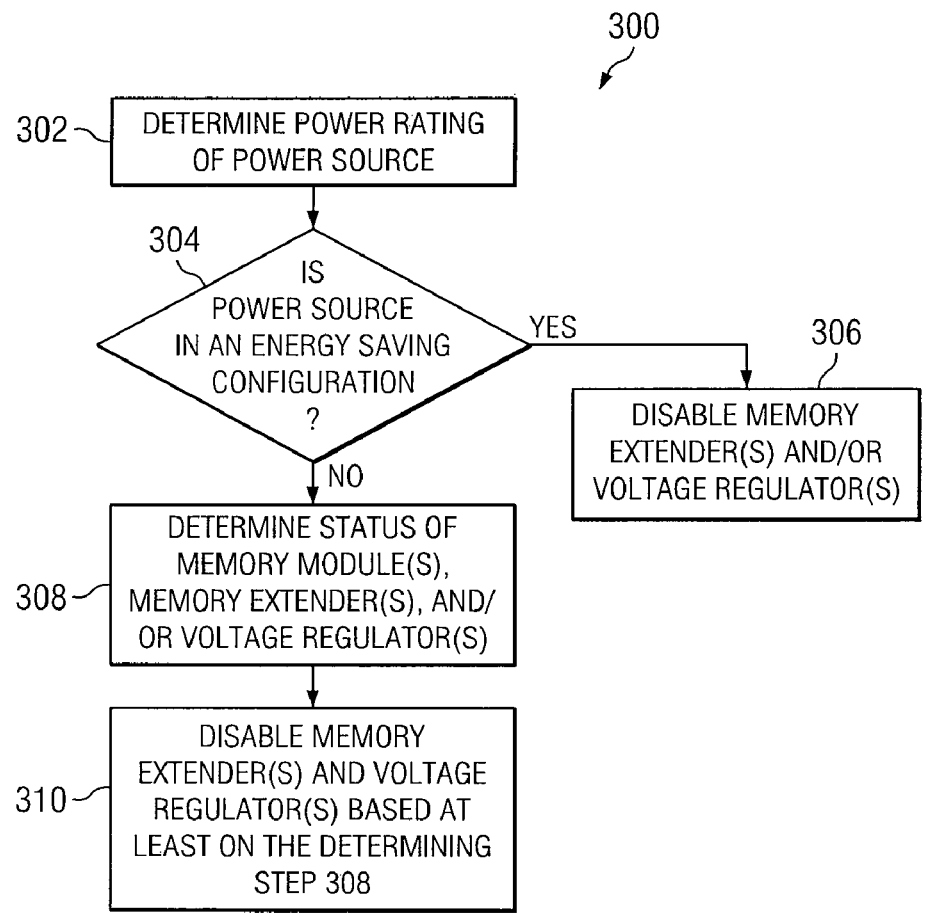
FIG. 3 illustrates a flow chart of an example method for managing power consumption of a memory block, in accordance with embodiments of the present disclosure.
Figure 2:
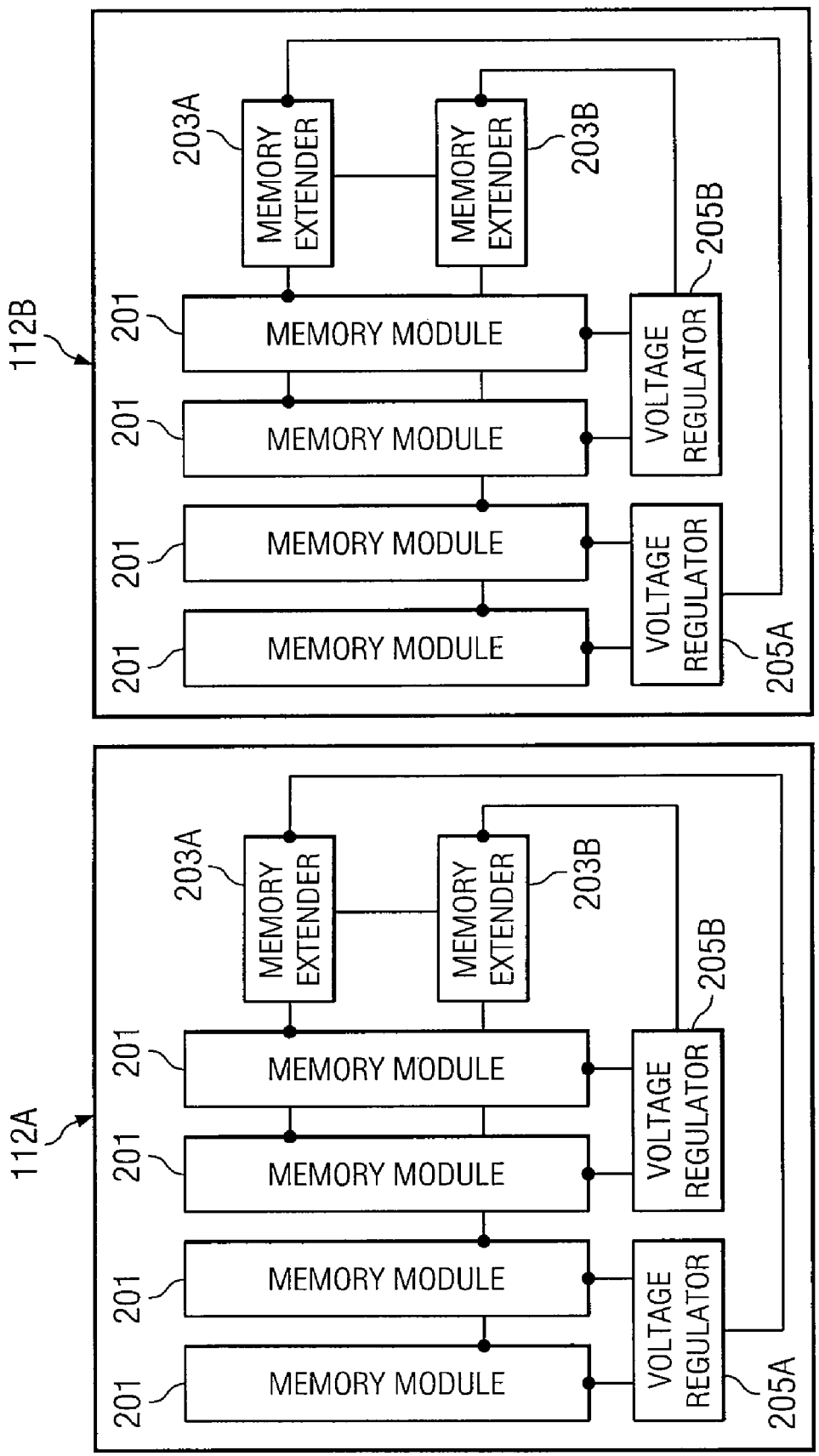
FIG. 2 illustrates a block diagram of a memory block of the information handling system of FIG. 1, in accordance with embodiments of the present disclosure.

Preferred embodiments and their advantages are best understood by reference to FIGS. 1 through 3, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and/or a video display. The information handling system may also include one or more buses operable to transmit communications between the various hardware components.

FIG. 1 illustrates a block diagram of an example information handling system 100 configured to provide power management for a memory device, in accordance with an embodiment of the present disclosure. As shown in FIG. 1, information handling system 100 may include a processor 102, a display 104, a network port 106, a power supply 108, a controller 110, and one or more memory devices 112.

Processor 102 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 102 may interpret and/or execute program instructions and/or process data stored in memory device(s) 112 and/or another component of information handling system 100 and may output results, graphical user interfaces (GUIs), websites, and the like via display 104 or over network port 106.

Display 104 may comprise any display device suitable for creating graphic images and/or alphanumeric characters recognizable to a user, and may include, for example, a liquid crystal display (LCD) or a cathode ray tube (CRT).

Network port 106 may be any suitable system, apparatus, or device operable to serve as an interface between information handling system 100 and a network. Network port 106 may enable information handling system 100 to communicate over a network using any suitable transmission protocol and/or standard, including without limitation all transmission protocols and/or standards known in the art.

Power supply 108 may include any device, system, or apparatus operable to supply power or electrical energy to one or more components of information handling system 100. For example, power supply 108 may include any system, device, and/or apparatus operable to supply direct current (DC) electrical power to one or more components of information handling system 100. In some embodiments, DC power supply 108 may include a battery and/or an AC/DC adapter that may convert 120- or 240-volt (or any other suitable voltage) alternating current supplied by a utility company to a regulated lower voltage DC power supply. In addition, an AC/DC adapter may also charge a battery while supplying power to information handling system 100.

In addition or alternatively, power supply 108 may include any system, device, and/or apparatus operable to supply AC electrical power directly to one or more components of an information handling system. In some embodiments, the AC power supply may subsequently be converted into a DC power supply (e.g., using an AC/DC converter).

In some embodiments, power supply 108 may include one or more uninterruptible power supplies and/or switch mode power supplies internal to or externally coupled to information handling system 100.

In some embodiments, power supply 108 may include an energy smart (ES) power system configuration operable to provide lower wattages to one or more components of information handling system 100.

Controller 110 may be coupled to processor 102 and may be embodied in hardware (e.g., system, device, or apparatus), software, firmware, or any combination thereof, and may be operable to determine the status of various components of memory device(s) 112. For example, controller 110 may determine: (1) the number of unpopulated memory module(s) of each memory device 112, if any; (2) the status of memory extender(s) coupled to the one or more memory module of each memory device 112; and/or (3) the status of voltage regulator(s) coupled to the memory module(s) and/or memory extender(s) of each memory device 112. Based on at least such status determinations, controller 110 may disable one or more memory extenders and/or voltage regulators to conserve power consumption. The subsystem including, for example, the memory modules, memory extenders, and voltage regulators is described in more detail with respect to FIG. 2.

In some embodiments, controller 110 may be configured to determine whether power supply 108 is in an energy saving power system configuration (e.g., where a user selected a lower wattage power system). For example, controller 110 may be configured to read the field replaceable unit (FRU) or nameplate of power supply 108 to determine the power rating of power supply 108. Alternatively, controller 110 may receive the rating information of power supply 108 from processor 102. Processor 102, and in particular, a BIOS running on processor 102 may determine the power rating of power supply 108 and may forward the rating to controller 110.

If controller 110 determines a energy saving power system configuration, controller 110 may disable one or more memory extenders and/or voltage regulators of one or more memory devices 112 to reduce power consumption.

Each memory device 112 may be coupled to processor 102 and may comprise any system, device, or apparatus operable to retain program instructions or data for a period of time. Memory 110 may be random access memory (RAM), electrically erasable programmable read-only memory (EEPROM), a PCMCIA card, flash memory, or any suitable selection and/or array of volatile or non-volatile memory that retains data after power to information handling system 100 is turned off.

FIG. 2 illustrates an example block diagram of a pair of example memory devices 112A and 112B for use in an information handling system 100, in accordance with certain embodiments of the present disclosure. Information handling system 100 may include any suitable number of memory devices 112, as shown in FIG. 2. Memory devices 112A and 112B may each include memory modules 201, memory extenders (MX) 203A and 203B, and voltage regulators (VR) 205A and 205B.

A memory module 201 may include a printed circuit board that secures one or memory chips onto a motherboard that houses processor 102. In some embodiments, memory modules 201 may be dual in-line memory modules (DIMMs), single in-line memory modules (SIMMs), a combination of the two, and/or other suitable memory modules.

Memory extenders 203A and 203B may be coupled to controller 110 and may include any suitable system, device, or apparatus for increasing the memory a communication bandwidth of memory modules 201 without increasing the number of memory modules 201 allocated for memory 112. One example memory extender 203 is an ADVANCED MICRO DEVICES' SOCKET G3 MEMORY EXTENDER (G3MX) used to connect memory modules to a single processor. In one embodiment, each memory extender 203 may be coupled to one or more memory modules 201. For example, memory extender 203A may be connected to two of the four memory modules 201 and memory extender 203B may be coupled the remaining two memory modules 201, as shown in FIG. 2. In some embodiments, memory device 112 may include a single memory extender 203 coupled to all memory modules 201 in the particular memory devices 112, or may include two or more memory extenders 203 that each couple to any number of memory modules 201 of each memory device 112.

In some embodiments, memory extenders 203 may be configured to supply data from memory module(s) 201 to processor 102 and receive commands from processor 102 to read data from and/or write data to memory module(s) 201. For example, memory extenders 203 may be coupled to a data bus (e.g., high speed differential bus) and a memory channel (e.g., DDR3 memory channel) coupled to memory modules 201 and may be configured to send and/or receive data from processor 102.

Voltage regulators 205A and 205B may be coupled to power supply 108 of information handling system 100, and may comprise any suitable system, device, or apparatus configured to maintain a substantially constant voltage level regardless of a current drawn by a load. In the example embodiment shown in FIG. 2, in each memory device 112, voltage regulator 205A may provide a substantially constant voltage level to memory extender 203A and two more memory modules and voltage regulator 205B may provide a substantially constant voltage level to memory extender 203B and the other two memory modules 201.

In operation, controller 110 and memory extenders 203 may provide additional memory bandwidth while reducing power consumption. In one embodiment, controller 110 operating in a dynamic mode may disable one or more memory extenders 203 and corresponding voltage regulator(s) 205 based at least on a number factors including, for example: (1) whether there are any unpopulated memory modules 201 (e.g., one or more memory modules not in use, one or more memory modules not including memory chips, etc.); (2) the status of memory extenders 203 (e.g., powered on but idle memory extenders); and/or (3) the status of voltage regulators 205 (e.g., inefficient, light load detected, idle, etc.) of memory device 112A and/or 112B. For example, if controller 110 detects there are one or more unpopulated slots in a particular memory module 201 (e.g., no memory chip present) in memory device 112, controller 110 may send a signal to processor 102 to disable the corresponding memory extender 203 and voltage regulator 205 coupled to the particular memory module 201 to conserve power.

In an energy smart power system configuration, where power supply 108 may operate within a certain power band to conserve energy, a user may decide (e.g., during an initial system configuration or during an upgrade) to not maximize the number of memory chips installed in memory modules(s) 201 and instead optimize energy consumption. Therefore, one or more memory modules 201 may not be in use. Controller 110 and/or processor 102 may disable one or more memory extenders 203 and one or more voltage regulators 205 coupled to the memory module(s) 201 not in use to conserve power.

In some embodiments, controller 110 may be configured to determine the power rating of power supply 108 and may disable one or more memory extenders 203 and/or voltage regulators 205 accordingly. Controller 110 operating in a static mode may receive from processor 102, and more particularly, a BIOS running on processor 102, a power rating for power supply 108. If the power rating is specific to an energy smart power system configuration, controller 110 and/or processor 102 may disable memory extender(s) 203A and/or 203B and voltage regulator 205A and/or 205B to reduce the power consumption.

FIG. 3 illustrates a method 300 for managing power consumption of a memory device 112 (e.g., memory device 112A or 112B of FIG. 2) in an information handling system 100, in accordance with embodiments of the present disclosure. At step 302, a power rating of power supply 108 may be determined. In one embodiment, controller 110 read the field replaceable unit (FRU) or nameplate of power supply 108 to determine the power rating of power supply 108. Alternately, processor 102 may determine the power rating of power supply 108 and may forward the rating to controller 110.

At step 304, controller 110 and/or processor 102 may determine whether the rating of power supply 108 indicates or corresponds to an energy saving (ES) power system configuration. If so, as shown at step 306, controller 110 may disable memory extender 203A and/or 203B and corresponding voltage regulator 205A and/or 205B.

Steps 302, 304, and 306 may be performed at the initial configuration of information handling system 100, where the information handling system 100 includes one or more power supply 108 in an energy saving (ES) power system configuration. Alternatively, steps 302, 304, and 306 may be performed during an upgrade of information handling system 100, where a user may select to conserve energy rather than maximize the usage of memory module(s) 201 of memory 112.

At step 308, if the rating of power supply 108 is not an energy saving (ES) power system configuration, controller 110 may determine the status of various components of memory device 112. For example, controller 110 may determine if there are any unpopulated memory modules 201 in memory device 112. In addition, controller 110 may determine the status of memory extender 203A and/or 203B coupled to the memory modules 201 of memory device 112 and/or the status of voltage regulator 205A and/or 205B (e.g., inefficient voltage regulator(s), light load detected, etc.).

At step 310, based on the status of the various components of memory device 112, controller 112 may disable one or memory extenders 203 and/or voltage regulators 205. For example, if controller 112 determines that one or more of the memory modules 201 are not populated, controller 112 may disable a corresponding memory extender 203 and/or voltage regulator 205 coupled to the unpopulated memory module 201.

Steps 308 and/or 310 may be performed automatically by controller 110 to reduce power consumption when components, such as memory modules 201, memory extenders 203, and/or voltage regulators 205 are not in use or needed. In one embodiment, controller 110 may perform steps 308 and 310 after a predetermined time has lapsed. In some embodiments, the predetermined time may be set by manually set by user or may be set by controller 110 and/or processor 102.

Although the present disclosure has been described in detail, it should be understood that various changes, substitutions, and alterations can be made hereto without departing from the spirit and the scope of the invention as defined by the appended claims.

What is claimed is:

1. An information handling system comprising:
    a processor;
    a power supply coupled to the processor;
    a memory device communicatively coupled to the processor, the memory device comprising:
        a plurality of memory modules; and
        a memory extender configured to extend bandwidth of the plurality of memory modules; and
    a controller operably configured to:
        determine a status of the power supply;
        determine a status of one or more of the memory modules; and
        based at least on the determined status of the power supply and the one or more memory modules, disable the memory extender.

2. The information handling system of claim 1, wherein determining the status of the power supply includes determining if the power supply is in an energy smart (ES) power system configuration.

3. The information handling system of claim 2, wherein determining if the power supply is in an energy saving configuration includes determining the power rating of the power supply.

4. The information handling system of claim 1, wherein the memory device further comprises a voltage regulator coupled to the memory extender and configured to provide a substantially constant voltage to the memory extender.

5. The information handling system of claim 4, wherein the controller is further configured to, based on the determined status, disable the voltage regulator.

6. The information handling system of claim 1, wherein determining the status of one or more of the memory modules comprises determining whether each of the memory modules is populated.

7. The information handling system of claim 1, wherein the controller is further configured to determine a state of the memory extender.

8. The information handling system of claim 7, wherein:
  determining the state of the memory extender includes determining whether the memory extender is idle; and
  based at least on the determined state, disabling the memory extender.

9. An apparatus, comprising:
  a memory device including:
    a plurality of memory modules; and
    a memory extender configured to extend bandwidth of the plurality of memory modules; and
  a controller coupled to the memory device, the controller operably configured to:
    determine a status of the power supply;
    determine a status of one or more of the memory modules; and
    based at least on the determined status of the power supply and the one or more memory modules, disable the memory extender.

10. The apparatus of claim 9, wherein determining the status of the power supply includes determining if the power supply is in an energy smart (ES) power system configuration.

11. The apparatus of claim 9, wherein the memory device further comprises a voltage regulator coupled to the memory extender and configured to provide a substantially constant voltage to the memory extender.

12. The apparatus of claim 11, wherein the controller is further configured to:
  determine a state of the memory extender; and
  determine a state of the voltage regulator.

13. The apparatus of claim 12, wherein the controller is further configured to based at least on the determined state, disable the memory extender or the voltage regulator.

14. A method, comprising:
  determining a status of a plurality of memory modules of a memory device;
  determining a status of a power supply coupled to the memory modules; and
  based at least on the determined status of the plurality of memory modules and the power supply, disabling at least one memory extender coupled to the memory modules, wherein the at least one memory extender is configured to extend a communication bandwidth of the memory modules.

15. The method of claim 14, wherein determining the status of the power supply includes determining if a power supply coupled to the memory device is in an energy smart (ES) power system configuration.

16. The method of claim 15, wherein determining the status of the power supply includes determining a power rating of the power supply.

17. The method of claim 16, further comprising based at least on the determined status, disabling the memory extender.

18. The method of claim 14, further comprising determining a state of a voltage regulator coupled to the memory extender.

19. The method of claim 18, wherein determining the state of the voltage regulator comprises determining if the voltage regulator is idle.

20. The method of claim 19, further comprising based at least on the determined state, disabling the voltage regulator.

* * * * *